United States Patent [19]

Ishihara

[11] Patent Number: 4,530,083
[45] Date of Patent: Jul. 16, 1985

[54] ROTATABLE MEMORY DISK APPARATUS

[75] Inventor: Atsushi Ishihara, Yokohama, Japan

[73] Assignee: Tokyo Shibaura Denki Kabushiki Kaisha, Kawasaki, Japan

[21] Appl. No.: 534,695

[22] Filed: Sep. 22, 1983

[30] Foreign Application Priority Data

Sep. 27, 1982 [JP] Japan .................... 57-168019

[51] Int. Cl.³ .................... G11B 17/06; G11B 19/24; G11B 17/00
[52] U.S. Cl. ............................ 369/267; 369/41; 369/240
[58] Field of Search ............... 369/266, 267, 240, 33, 369/41

[56] References Cited

U.S. PATENT DOCUMENTS

| 4,190,860 | 2/1980 | Somers et al. | 369/266 |
| 4,361,880 | 11/1982 | Kitamura et al. | 369/33 |
| 4,416,006 | 11/1983 | Kitamura et al. | 369/267 |
| 4,450,552 | 5/1984 | Marcantonio | 369/267 |

*Primary Examiner*—Steven L. Stephan
*Attorney, Agent, or Firm*—Cushman, Darby & Cushman

[57] ABSTRACT

A rotatable memory disk apparatus is provided with a memory disk with a number of tracks driven by a motor and a control circuit for positioning an optical head on an addressed track. The apparatus includes a speed control device for rotating the disk at a rotational speed corresponding to the addressed track. The speed control device includes a conversion circuit for converting a track-addressing signal from the control circuit into an instruction signal for the rotational speed of the disk, a detector for obtaining a rotational speed signal of the disk, and a control device which receives the rotational speed instruction signal and the rotational speed signal to rotate the disk at a predetermined rotational speed for the addressed track.

2 Claims, 2 Drawing Figures

F I G. 1
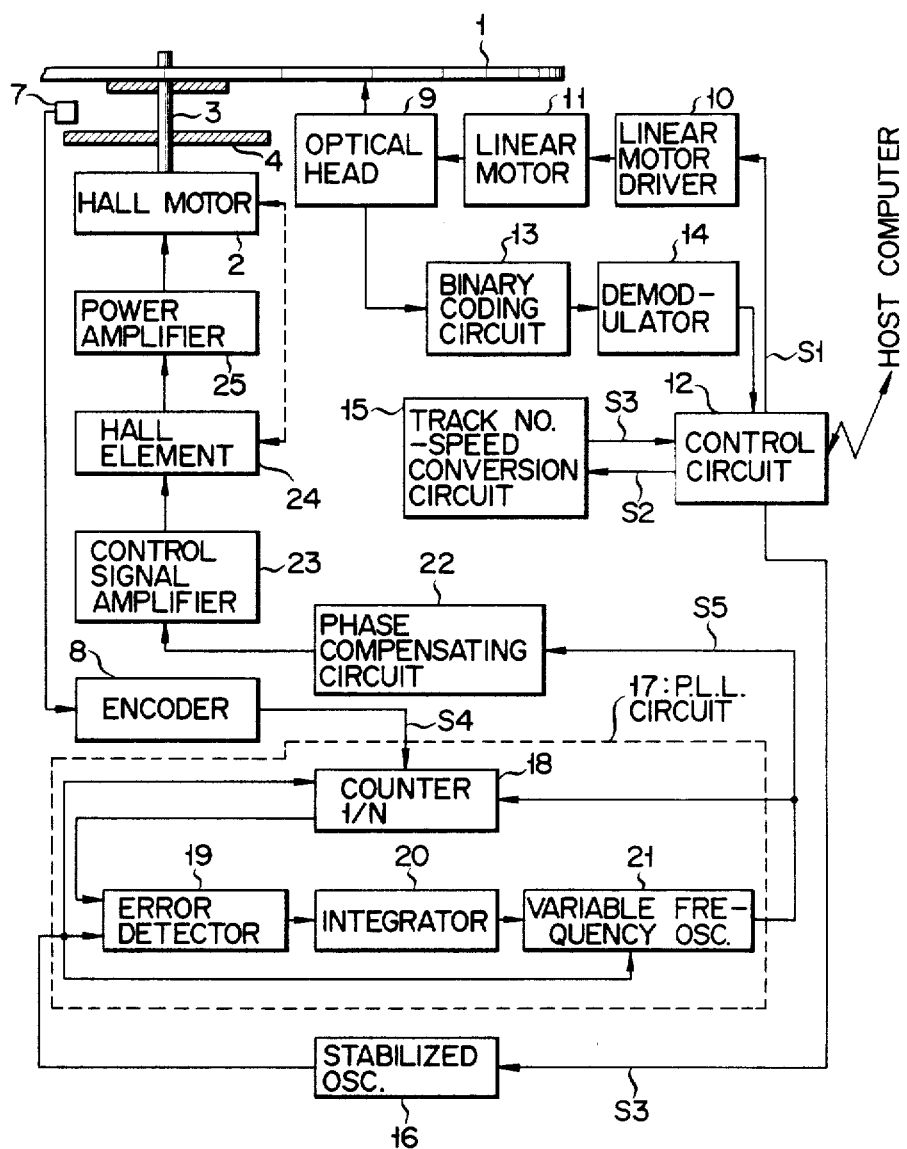

F I G. 2
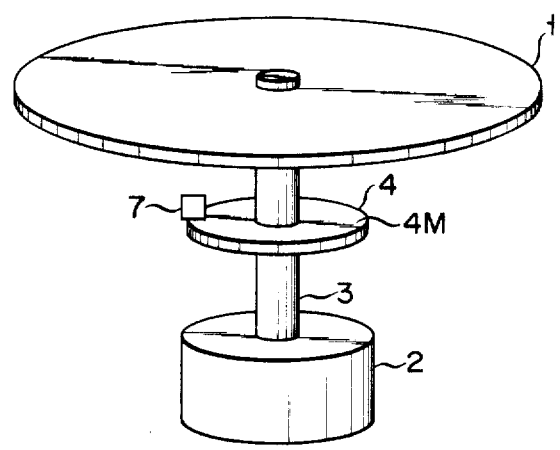

ROTATABLE MEMORY DISK APPARATUS

BACKGROUND OF THE INVENTION

The present invention relates to a rotatable memory disk apparatus and, more particularly, to a rotatable memory disk apparatus which records data on tracks of the memory disk or reproduces the recorded data while the memory disk rotates.

A recent document filing system, for example, employs an optical disk apparatus. The optical disk apparatus is provided with a number of spiral or coaxial tracks. Data are recorded or the recorded data are reproduced on or from the tracks, while the optical disk rotates. For data recording, the filing system two-dimensionally optically scans a document to obtain optical image data thereof, converts the optical image data into corresponding electrical image data by photoelectric conversion means, and then optically records the electrical image data on the tracks of the optical memory disk. The recorded data is retrieved, as required, and is reproduced in the form of hard or soft copy. An optical head, which is disposed close to the surface of the optical memory disk, is used for recording or reproducing the electrical image data from the rotating optical memory disk. The optical head is mechanically coupled with a linear motor which is linearly driven in a radial direction of the optical disk. A position detector for detecting the position of the carriage for the linear motor, that is, the position of the optical head is provided. The position detector includes an optical linear scale system which includes a first lattice pattern movable together with the carriage and a second lattice pattern which is fixed on a stationary position and serves as an optical filter. The first and second lattice patterns are arranged between a light emitting element and a light detector in this order. While the position of the carriage or the position of the optical head is detected by the position detector, the linear motor is moved according to the detected position. Thus the optical head is positioned at an addressed track with an accuracy of 0.1 mm or less. The positioning means for the optical head is well-known and description thereof will be omitted. The outer tracks of the optical memory disk are longer than the inner tracks. For recording the data at a high density, therefore, the rotational speed of the optical memory disk for recording the data in the outer tracks must be slower than for recording the data in the inner tracks. To be more specific, in the recording and reproduction of data, the rotational speed of the optical memory disk must be controlled so that any given track always has a constant speed relative to the optical head. To this end, it is necessary to have means for changing the rotational speed of the optical memory disk according to the position of the addressed track on the optical memory disk. The conventional rotatable memory disk apparatus employs means to change the rotational speed of the optical memory disk in response to a signal representing the position of the head detected by the position detector. This approach, however, requires time until the rotational speed of the memory disk becomes stable, that is, the rotational speed corresponds to a final position of the head at which the addressed track is located. Also, during this period, the memory disk continues its rotation and the head also continues to flow up the addressed track. Therefore, in the case of spiral track, the position of the head during the time in which the head flows up the addressed track is shifted from the position predetermined for the addressed track. This means that data recording and data reproduction can not be conducted on an addressed track under the condition that the memory disk rotates in a rotational speed predetermined for the addressed track. Also, there is a case in which data is recorded on a memory disk by using a first disk apparatus and the data are reproduced by using a second disk apparatus. In such a case, if a difference of part fittings exists between the first and second disk apparatuses, the rotational speeds of the disk for the same track differs from each other in the first and second disk apparatuses. This gives a remarkably bad result during data reproduction.

SUMMARY OF THE INVENTION

Accordingly, an object of the present invention is to provide a rotatable memory disk apparatus which can control the rotational speed of a rotatable memory disk so that the rotational speed is controlled to be equal to that predetermined for an addressed track number on the disk.

A rotatable memory disk apparatus according to the present invention comprises a rotatable memory disk having a plurality of tracks on which data are recorded or from which the recorded data are reproduced, a motor for rotating the memory disk, head means including a head for recording the data on or reproducing the recorded data from an addressed track, a control circuit for producing a first track-addressing signal to drive the head to a position corresponding to the addressed track, and speed control means for controlling the rotational speed of the motor. The speed control means comprises track-number speed-conversion means coupled to the control circuit, the conversion means receiving from the control circuit a second track-addressing signal corresponding to the first track-addressing signal and producing a rotational speed instruction signal in response to the second track-addressing signal, speed detecting means for obtaining a rotational speed signal of the motor, control means which receives the rotational speed signal and the rotational speed instruction signal and controls the rotational speed of the motor in such a manner that the motor is driven at a rotational speed which is predetermined corresponding to the addressed track.

BRIEF DESCRIPTION OF THE DRAWINGS

FIG. 1 is a block diagram illustrating an embodiment of a rotatable memory disk apparatus according to the present invention;

FIG. 2 shows a perspective view of a mechanical coupling of an optical memory disk with a motor for driving the disk.

DETAILED DESCRIPTION OF THE PREFERRED EMBODIMENT

A disk 1 and a hall motor 2, which are shown in FIG. 1, are coupled to each other by means of a shaft 3, as shown in FIG. 2. Fixed to the shaft 3 is a signal producing disk 4 for generating signals representing the rotational speed of the disk 1. The signal producing disk 4 is equidistantly provided with marks 4M on the periphery. The marks 4M are optically detected by means of a speed detector 7 including a light emitting diode and a photo-detecting element. The output signals of the speed detector 7 represent rotational speeds of the disk.

The signals are converted into a code signal or a rotational speed signal S4 as previously set by an encoder 8.

An optical head 9, provided close to the under surface of the disk 1, is mounted to a linear motor 11 driven by a linear motor driver 10, thereby to be moved in a radial direction. A control circuit 12 for controlling the overall rotatable memory disk apparatus is connected with a host computer. When receiving an address signal for an address track on the disk 1, the control circuit 12 applies this address signal as a first track-addressing signal S1 to the linear motor driver 10. With this signal, the optical head 9 is driven toward the position of the addressed track. The control circuit 12 receives the data reproduced by the head from the addressed track, by way of a binary coding circuit 13 and a demodulation circuit 14. The reproduced data includes information with respect to tracks on the disk and the control circuit 12 can detect the position of the addressed track. The optical head 9 includes a focusing mechanism which drives an objective lens in the direction perpendicular to the surface of the disk for positioning a laser beam spot on the disk surface, a tracking mechanism for following up an addressed track by moving the objective lens in the radial direction of the disk by a minute distance, a track jump mechanism which drives the objective lens in the radial direction of the disk by a distance corresponding to the track pitch thereby moving the objective lens from a current track position to another track position, and a data recording and reproducing mechanism which records data on an addressed track and reproduces the recorded data. The optical head 9 includes, for example, a laser oscillator, a collimating lens for collimating the laser beam from the oscillator, a beam splitter for splitting the laser beam from the collimating lens, a $\lambda/4$ wave length plate, an objective lens, voice coil motors for driving the objective lens, and photodetectors, etc. The control circuit 12, when receiving the address signal for a track coming from the host computer, converts the addressed track number signal into a scale value by means of the ratio of the track pitch to the lattice pitch of the before mentioned lattice pattern. Then, the control circuit 12 drives the linear motor 10 until the scale value obtained from the above-mentioned first lattice pattern included in the position detecting mechanism concides with the scale value converted from the addressed track number signal. The position of the optical head at that time in which both scale values are in coincidence with each other corresponds to the position of the addressed track with accuracy of 0.1 mm or less. If necessary, the track jump mechanism may be used in order to position the head to the position of the addressed track. The method for moving the head to an addressed track, the method for recording data on the addressed track and the method for reproducing the recorded data are all well known and no further explanation thereof will be given.

The control circuit 12 also applies a second track-addressing signal S2 corresponding to the first track-addressing signal S1 to the track number-speed conversion circuit 15. Then, the conversion circuit 15 produces the rotational speed instruction signal S3 for the disk 1 corresponding to the addressed track. The conversion circuit 15 is so designed as to produce 96 different rotational speed instruction signals S3 for the total number of tracks. When the rotational speed instruction signal S3 is applied to an oscillation circuit 16, the circuit 16 produces a signal with a frequency corresponding to the rotational speed instruction signal S3, or the addressed track.

A phase locked loop (PLL) circuit 17 receives a code signal from the encoder 8, i.e. a rotational speed signal S4 and the output signal from the oscillation circuit 16, and produces a speed control signal S5 with a frequency N times the output frequency of the oscillation circuit 16. The PLL circuit 17 has a closed loop containing a counter 18, an error detector 19, an integrator 20, and a variable frequency oscillator 21. The output signal of the oscillation circuit 16 is supplied to the counter 18 for dividing the counter output frequency by a factor of N. The error detector 19 detects the error as a difference between the counter output frequency and the output frequency of the oscillation circuit 16. The integrator 20 integrates the output signal of the error detector 19. Output signals of the integrator 20 and the oscillation circuit 16 are supplied to the variable frequency oscillator 21, thereby controlling the frequency of the output signal from the variable frequency oscillator 21 to be N times the output frequency of the oscillation circuit 16. The counter 18 and the variable frequency oscillator 21 are coupled to each other, as shown. The phase of the output signal of the PLL circuit 17 or the phase of the speed control signal S5, is compensated by a phase compensating circuit 22. The phase compensated signal is amplified by a control signal amplifier circuit 23. The output signal of the control signal amplifier circuit 23 is applied to a hall element 24 magnetically coupled to the exciting coil of the hall motor 2. The output signal from the hall element 24 is amplified by a power amplifier 25. The rotational speed of the hall motor 2 is controlled by adjusting the current flowing through the exciting coils of the hall motor 2 with the output signal of the power amplifier 25.

The operation of the rotatable memory disk apparatus shown in FIG. 1 will be described. The following explanation is a case in which data is read out from the disk 1. Assume now that a track number signal of the track to be addressed is supplied from the host computer to the control circuit 12. The control circuit 12 supplies a first track-addressing signal S1 to the linear motor driver 10, thereby driving the optical head 9 in a radical direction of the disk 1. Finally, the optical head 9 is set at a position of the addressed track specified by the signal S1. The optical head 9 reproduces the data recorded in the addressed track and encodes the reproduced data by the binary coding circuit 13. The coded data is demodulated by the demodulation circuit 14 and applies the demodulated data through the control circuit 12 to the host computer where it is appropriately processed. The addressed track number is supplied as a second track-addressing signal S2 corresponding to the addressed track number to the conversion circuit 15. The conversion circuit 15 applies a rotational speed instruction signal S3 corresponding to the addressed track number or the second track-addressing signal S2 to the oscillation circuit 16, via the control circuit 12. The oscillation circuit 16 applies the rotational speed instruction signal S3, i.e. a signal with a frequency corresponding to the addressed track, to the PLL circuit 17. The counter 18 counts the rotational speed signal S4 from the encoder 8, and supplies 1/N of the count of the counter to the error detector 19. As a result, the PLL circuit 17 produces a speed control signal S5. The speed control signal S5 has a frequency N times the output frequency of the oscillation circuit 16. The speed control signal S5 is phase-compensated by the phase compensating circuit 22 and is amplified by the control signal amplifier circuit 23. The amplified signal is applied to the hall element 24. The output signal from the hall element 24 is amplified by the power amplifier 25 and then is applied to the hall motor 2. The hall motor 2 is controlled at a predetermined rotational speed for the addressed track.

According to the above-mentioned embodiment, even if the optical head 9 is not on the addressed track, the disk 1 runs at a predetermined rotational speed for the addressed track. Therefore, the rotatable memory disk apparatus can accurately reproduce the data in the addressed track. The recording of the data into the addressed track can likewise be executed with high accuracy.

What is claimed is:

1. A rotatable memory disk apparatus comprising:
   a rotatable memory disk having a plurality of tracks on which data are recorded or from which the recorded data are reproduced;
   a motor for rotating said memory disk;
   head means including a head for recording said data or reproducing said recorded data on or from an addressed track of said tracks;
   a control circuit for producing a first track-addressing signal to drive said head to a position corresponding to said addressed track; and
   speed control means for controlling the rotational speed of said motor;
   wherein said speed control means comprises:
   track number-speed conversion means coupled to said control circuit, said conversion means receiving from said control circuit a second track-addressing signal corresponding to said first track-addressing signal for producing a rotational speed instruction signal in response to said second track-addressing signal;
   speed detecting means for obtaining a rotational speed signal of said motor;
   control means for receiving said rotational speed signal and said rotational speed instruction signal, and for controlling the rotational speed of said motor by driving said motor at a rotational speed which is predetermined according to said addressed track.

2. A rotatable memory disk apparatus according to claim 1, wherein said control means comprises:
   an oscillator which receives said rotational speed instruction signal to produce an output signal having a frequency corresponding to said rotational speed instruction signal;
   a phase locked loop circuit which receives the output signal of said oscillator and said rotational speed signal of said speed detecting means for producing an output signal having a frequency N times the output frequency of said oscillator, N being predetermined according to said addressed track;
   a phase compensating circuit for compensating the phase of the output signal of said phase locked loop circuit; and
   a hall element which is driven by the output signal of the phase compensating circuit, said hall element being used for controlling the rotational speed of said motor.

* * * * *